(12) United States Patent
Chen et al.

(10) Patent No.: US 7,747,177 B2
(45) Date of Patent: Jun. 29, 2010

(54) COHERENT PHASE-SHIFT-KEYING

(75) Inventors: Young-Kai Chen, Berkeley Heights, NJ (US); Ut-Va Koc, Bridgewater, NJ (US); Andreas Bertold Leven, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 303 days.

(21) Appl. No.: 11/204,607

(22) Filed: Aug. 15, 2005

(65) Prior Publication Data
US 2007/0036555 A1   Feb. 15, 2007

(51) Int. Cl.
*H04B 10/00*   (2006.01)
(52) U.S. Cl. ............... 398/206; 398/208; 398/204; 398/209; 398/213
(58) Field of Classification Search ......... 398/202–214
See application file for complete search history.

(56) References Cited

U.S. PATENT DOCUMENTS

| | | | | |
|---|---|---|---|---|
| 4,732,447 | A * | 3/1988 | Wright et al. ............... | 385/46 |
| 5,077,531 | A | 12/1991 | Takeuchi et al. ............ | 329/304 |
| 5,515,197 | A | 5/1996 | Hooijmans et al. ......... | 359/189 |
| 6,035,004 | A | 3/2000 | Nakata | |
| 6,038,267 | A * | 3/2000 | Oura et al. ................. | 375/329 |
| 6,473,222 | B2 | 10/2002 | Hait et al. .................. | 359/326 |
| 7,266,310 | B1 * | 9/2007 | Savory et al. .............. | 398/205 |
| 7,327,913 | B2 | 2/2008 | Shpantzer et al. .......... | 385/15 |
| 2007/0092259 | A1 | 4/2007 | Bontu et al. ............... | 398/147 |

FOREIGN PATENT DOCUMENTS

| | | |
|---|---|---|
| EP | 0 451 289 | 10/1991 |
| GB | 2 259 419 | 3/1993 |
| JP | H09-266499 | 10/1997 |

OTHER PUBLICATIONS

Koc, U.-V. et al., "Digital Coherent Differential Quadrature Phase-Shift-Keying (DQPSK)", Optical Fiber Communication (OFC) Conference proceedings, 3 pages, Anaheim, CA, Mar. 9, 2006.
Tsukamoto, S. et al., "Coherent Demodulation of 40-Gbit/s Polarization-Multiplexed QPSK Signals with 16-GHz Spacing after 200-km Transmission," in Proceedings of Optical Fiber Communication, pp. PDP29-1—3, Anaheim, CA, Mar. 10, 2005.

(Continued)

*Primary Examiner*—Agustin Bello
(74) *Attorney, Agent, or Firm*—Alex Yip (57) ABSTRACT

A receiver for coherent detection of a PSK modulated optical carrier includes an optical detector, digital-to-analog converters, and a digital module. The optical detector is configured to mix the modulated optical carrier with two phase components of a reference optical carrier and to produce analog output signals representative of optical signals produced by said mixing. The digital-to-analog converters are connected to receive the analog output signals and to produce digital signals from the received analog output signals. The digital module is connected to receive the digital signals and to perform one of compensating the received digital signals for a conjugate phase misalignment between the mixed components, extracting phase of the received digital signals, and estimating a frequency offset between the two carriers from the received digital signals.

17 Claims, 10 Drawing Sheets

OTHER PUBLICATIONS

Ly-Gagnon, D.-S. et al., "Unrepeatered optical transmission of 20 Gbit/s quadrature phase-shift keying signals over 210 km using homodyne phase-diversity receiver and digital signal processing," Electronics Letters, vol. 41, No. 4, 2 pages, Feb. 17, 2005.

Derr, F., Coherent Optical QPSK Intradyne System: Concept and Digital Receiver Realization, Journal of Lightwave Technology, vol. 10, No. 9, pp. 1290-1296, Sep. 1992.

Noe, R., "Phase Noise-Tolerant Synchronous QPSK/BPSK Baseband-Type Intradyne Receiver Concept With Feedforward Carrier Recovery," Journal of Lightwave Technology, vol. 23, No. 2, pp. 802-808, Feb. 2005.

Noe, R., "PLL-Free Synchronous QPSK Polarization Multiplex/Diversity Receiver Concept With Digital I&Q Baseband Processing," IEEE Photonics Technology Letters, vol. 17, No. 4, pp. 887-889, Apr. 2005.

Fitzgibbon, A.W. et al., "Direct Least Squares Fitting of Ellipses," IEEE Transactions on Pattern Analysis and Machine Intelligence, vol. 21, No. 5, pp. 476-480, 1999.

Halir, R. et al., "Numerically Stable Direct Least Squares Fitting of Ellipses," The Sixth International Conference in Central Europe on Computer Graphics and Visualization '98, 8 pages, Bory, Czech Republic, Feb. 1998.

Taylor, Michael G., Coherent Detection Method Using DSP for Demodulation of Signal and Subsequent Equalization of Propagation Impairments, IEEE Photonics Technology Letters, vol. 16, No. 2, pp. 674-676, Feb. 2004.

Chand, N. et al., "Significant Performance Advantage of Electroabsorption Modulator Integrated Distributed Feedback Laser (EML) Transmitter in Transporting Multicarrier QAM Signals," Journal of Lightwave Technology, vol. 19, No. 10, pp. 1462-1468, Oct. 2001.

Tsukamoto, S. et al., "Coherent Demodulation of 40-Gbit/s Polarization-Multiplexed QPSK Signals with 16-GHz Spacing after 200-km Transmission," Optical Fiber Communication Conference 2005, Technical Digest OFC/NFOEC, Anaheim, CA, USA, pp. 85-87, Mar. 6, 2005.

PCT International Search Report dated Nov. 28, 2006 (PCT/US2006/030322), 4 pages.

D.-S, LY-Gagnon, K. Katoh, and K. Kituchi, "Unrepeated 210-km Transmission with Coherent Detection and Digital Signal Processing of 20-Gb/s QPSK Signal" (Optical Fiber Communication Conference, 2005, Technical Digest. OFC/NFOEC, The United States, Mar. 2005, vol. 2, OTuL4).

* cited by examiner

FIG. 5A
DIGITAL COHERENT DQPSK [10Gbaud]

FIG. 5B
TRANSFORMED CONSTELLATION

COHERENT PHASE-SHIFT-KEYING

BACKGROUND

1. Field of the Invention

The invention relates to coherent detection methods for phase-shifting-keying and apparatus for performing such methods.

2. Discussion of the Related Art

Quadrature phase-shift-keying (QPSK) is a more bandwidth-efficient modulation scheme than simple on-off modulation schemes. In wireline and wireless communication systems, QPSK receivers typically have an analog phase lock loop (PLL) for providing the type of coherent detection typically needed to implement a QPSK modulation scheme. The PLL provides feedback that enables phase and frequency tracking of the transmitted optical carrier by a local oscillator. The local oscillator provides a reference signal for down mixing of the modulated carrier wave received from the transmitter.

In optical communication systems, schemes using an optical PLL have been proposed for implementing coherent detection. In such schemes, the optical receiver has a local optical oscillator for down mixing the received modulated optical carrier and also has an optical PLL. The optical PLL feeds back information for phase and frequency synchronizing the local optical oscillator to the optical carrier.

Unfortunately, the construction of optical PLLs is often difficult to achieve. For example, conventional laser sources often have large line widths. The large line widths can make optical phase synchronization difficult at data transmission rates. Indeed, an absence of efficient and inexpensive apparatus for implementing such synchronization has hindered the development of coherent optical communications systems that could otherwise more efficiently use the available optical bandwidth.

BRIEF SUMMARY

Whereas some conventional schemes for coherent optical detectors have proposed synchronizing the detector's local optical oscillator via a phase lock loop (PLL), various embodiments of optical detectors herein digitally perform the synchronization needed for coherent detection in phase-shift keying (PSK) modulation schemes. Instead of rigid phase and frequency locking of the local light source to the received modulated optical carrier, these optical detectors have a digital module that effectively provides for such phase and frequency synchronization. Such digital implementations of coherent PSK detection can provide a high communication bandwidth without many difficulties associated with optical PLLs.

In one aspect, the invention provides a receiver for coherent detection of a PSK modulated optical carrier. The receiver includes an optical detector, digital-to-analog converters, and a digital module. The optical detector is configured to mix the modulated optical carrier with two phase components of a reference optical carrier and to produce analog output signals representative of optical signals produced by said mixing. The digital-to-analog converters are connected to receive the analog output signals and to produce digital signals from the received analog output signals. The digital module is connected to receive the digital signals and to perform one of compensating the received digital signals for a conjugate phase misalignment between the mixed components, extracting phases of the received digital signals, and estimating a frequency offset between the two carriers from the received digital signals.

In another aspect, the invention provides a method. The method includes mixing a PSK modulated optical carrier with first and second phase components of a reference optical carrier and producing electrical signals that measure intensities of optical signals formed by the mixing. The method also includes digitalizing the electrical signals to produce a series of digital signals, evaluating derivatives of phases of the digital signals, and decoding the PSK modulated optical carrier based on the evaluated derivatives.

In another aspect, the invention features an apparatus that includes a digital module. The digital module is configured to evaluate a sequence of PSK symbols that modulates a received carrier by decoding a stream of digital signals produced by down mixing the carrier with a reference carrier. The digital module is configured to perform one of compensating the digital signals for conjugate phase misalignment during the down mixing, extracting phases of the digital signals, and estimating a frequency offset between the modulated carrier and the reference carrier from the digital signals.

BRIEF DESCRIPTION OF THE DRAWINGS

Various embodiments are described in the Figures and Detailed Description of Illustrative Embodiments. Nevertheless, the invention may be embodied in various forms and is not limited to the embodiments described in the Figures and Detailed Description of Illustrative Embodiments.

In the various Figures, like reference numerals indicate features with similar functions.

DETAILED DESCRIPTION OF ILLUSTRATIVE EMBODIMENTS

Figure 1A:
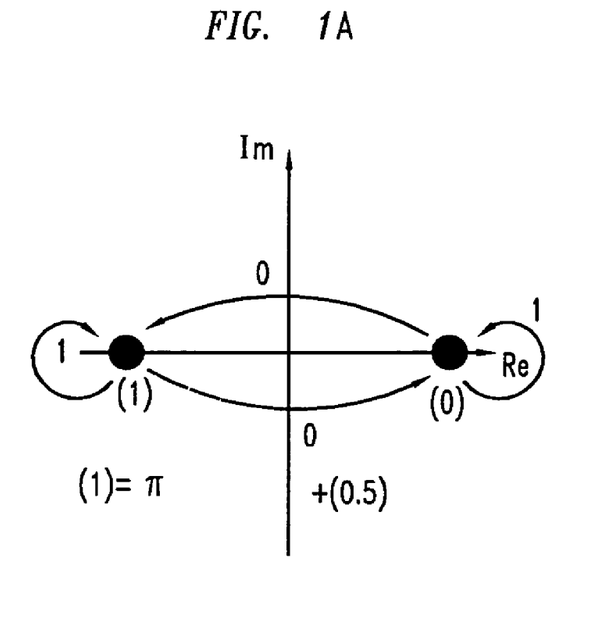
FIG. 1A shows a constellation of signal points for binary phase-shift keying (BPSK)
Figure 1B:
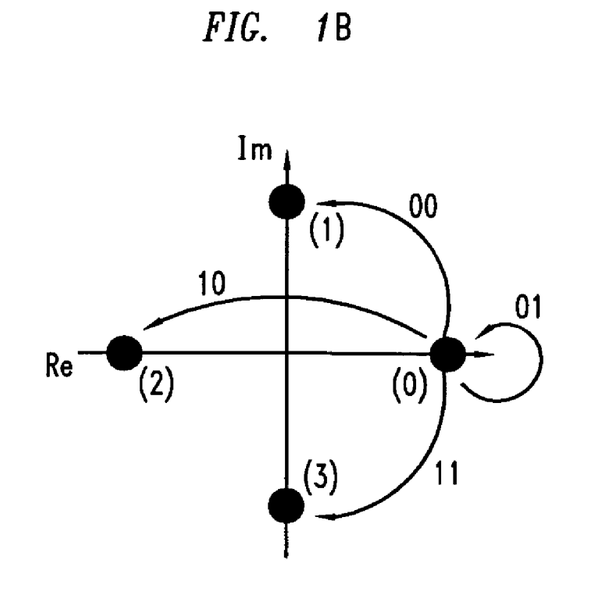
FIG. 1B shows a constellation of signal points for quadrature phase-shift keying (QPSK)
Figure 1C:
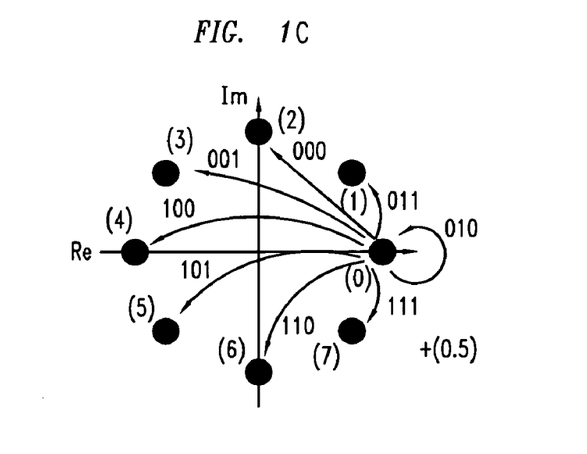
FIG. 1C shows a constellation of signal points for 8 phase-shift keying (8PSK)
Figure 1D:
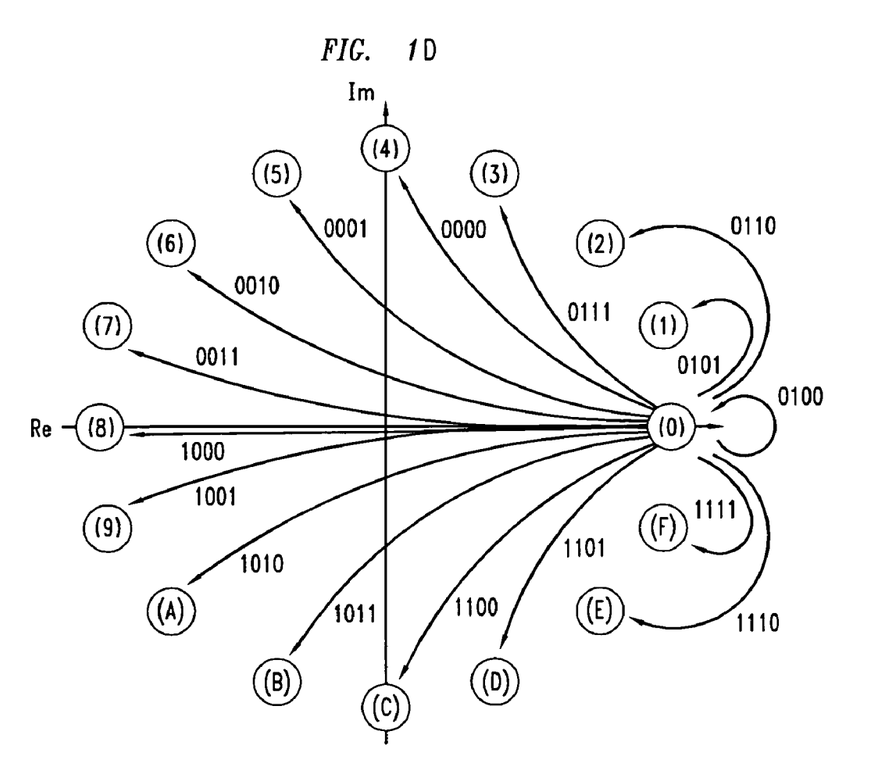
FIG. 1D shows a constellation of signal points for 16 phase-shift-keying (16PSK)

FIGS. 1A-1D illustrate the signal points, i.e., symbols, of various types of phase-shift keying (PSK). FIG. 1A shows a binary PSK (BPSK) constellation in which the two signal points 0 and 1 lie on the unit circle at the azimuthal angles of 0 and $\pi$, respectively. FIG. 1B shows a quadrature PSK (QPSK) constellation in which the four signal points 0, 1, 2, and 3 lie on the unit circle at the azimuthal angles of 0, $\pi/2$, $\pi$, and $3\pi/2$, respectively. FIG. 1C shows an eight PSK (8PSK) constellation in which the eight signal points 0, 1, 2, 3, 4, 5, 6, 7 and 8 lie on the unit circle at the azimuthal angles of $M\pi/4$ where M=0, 1, 2, ... 7. FIG. 1D shows a sixteen PSK (16PSK) constellation in which sixteen signal points 0, 1, 2, 3, 4, 5, 6, 7, 8, 9, A, B, C, D, E, and F lie on the unit circle at the azimuthal angles $M\pi/8$ where M=0, 1, 2, ..., 15.

In FIGS. 1A-1D, arrows illustrate motions of the PSK signal points in differential coding. In BPSK, QPSK, 8PSK, and 16PSK, one symbol encodes 1, 2, 3, and 4 bits, respectively. Thus, the arrows include labels for the multi-bit sets encoded by various motions between the signal points of the underlying BPSK, QPSK, 8PSK, and 16PSK of FIGS. 1A-1D. For example, in the differential QPSK scheme, the motion of QPSK signal point 0 into respective QPSK signal points 0, 1, 2, and 3 may be, e.g., differentially encoded by bit pairs 01, 00, 10, and 11.

Herein, various types of optical transmitters encode data according to one of the PSK schemes, e.g., a PSK scheme of FIGS. 1A-1D in differential coding. Then, various embodiments of the optical receiver 10 also decode the modulated optical carrier according to the same PSK scheme, e.g., one of the PSK schemes of FIGS. 1A-1D via a differential technique.

Figure 2:
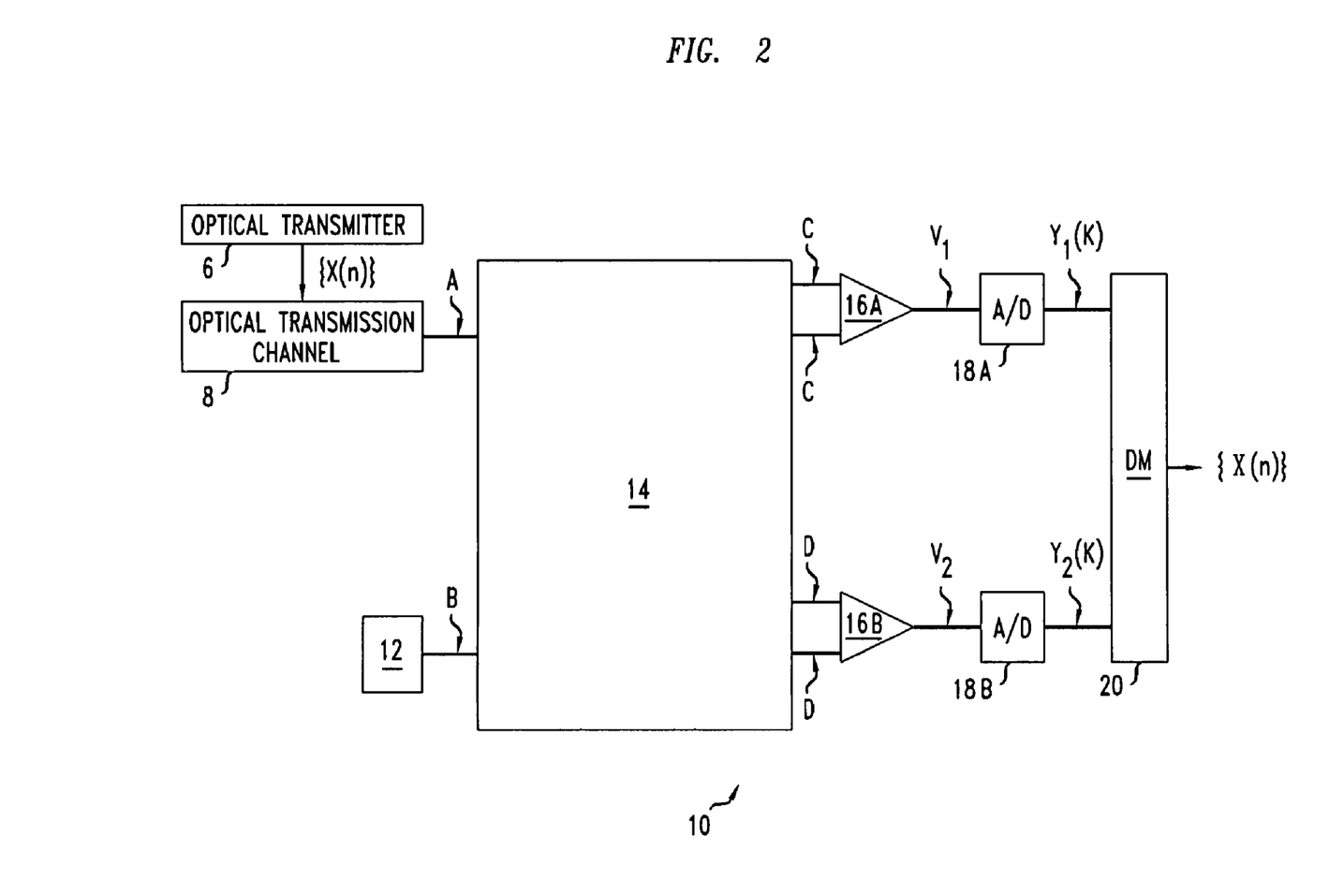
FIG. 2 is a block diagram for an exemplary embodiment of an optical receiver that is configured for coherent detection of a phase-shift-keying (PSK) modulated optical carrier in differential encoding.

FIG. 2 shows an example of an optical receiver 10 that is configured to perform coherent differential detection of a PSK modulated optical carrier, e.g., an optical carrier modulated according to one of the PSK schemes of FIGS. 1A-1D. The optical receiver 10 includes a local optical oscillator 12; a 2×2 optical detector 14; differential amplifiers 16A-16B; digital-to-analog (D/A) converters 18A, 18B; and a digital module (DM) 20.

The local optical oscillator 12 transmits a continuous-wave (CW) reference optical carrier to optical input B of the 2×2 optical detector 14. The other optical input A of the 2×2 optical detector 14 receives a PSK modulated optical carrier from the optical transmitter 6 via an optical transmission channel 8. The optical transmission channel 8 may be a free space channel or an optical fiber line. The local optical oscillator 12 may be, e.g., a CW coherent light source such as a diode laser.

The CW reference optical carrier down mixes the PSK modulated optical carrier in the 2×2 optical detector 14. For that reason, the local optical oscillator 12 is designed to generate a reference optical carrier whose frequency, $\omega_{LO}$, is approximately equal to the frequency, $\omega_{OC}$, of the PSK modulated optical carrier from the optical transmitter 6. Nevertheless, the optical receiver 10 does not have an optical phase lock loop (PLL) that tightly locks the phase and frequency of reference optical carrier from the local optical oscillator 12 to the frequency of the PSK modulated optical carrier from the optical transmitter 6. Indeed, line widths of light from the local optical oscillator 12 and the optical transmitter 6 typically produce frequency variations that would be sufficient to destroy such a tight optical synchronization. For that reason, the reference optical carrier of the local optical oscillator 12 will generally have both a phase offset, $\theta_n$, and a frequency offset, i.e., $\omega_{LO}-\omega_{OC}$, with respect to the PSK modulated optical carrier received at the optical input A. Indeed, the frequency offset should slowly drift in time due to line width variations in both optical sources.

The 2×2 optical detector 14 receives the PSK modulated optical carrier and the CW reference optical carrier at its optical inputs A, B. From these optical carriers, the 2×2 optical detector generates analog electrical signals at a first pair of electrical outputs C and a second pair of electrical outputs D. The differential amplifiers 16A and 16B convert these electrical signals into analog voltages $V_1$ and $V_2$ that carry information corresponding to the PSK phase modulation on the optical carrier received at optical input A. For example, the electric field, $E_1$, of the PSK modulated optical carrier may be written as $E_1(t)=A \cdot \exp[i(\theta_S+\theta_n+t\omega_{OC})]$. For this PSK modulated optical carrier, the 2×2 electro-optical detector 14 and differential amplifier 16A are configured to produce an analog output voltage $V_1$ of the form $A' \cos(\theta_S+\theta_n+t[\omega_{OC}-\omega_{LO}])$, and the 2×2 electro-optical detector 14 and differential amplifier 16B are configured to produce an analog output voltage $V_2$ of the form $A' \sin(\phi+\theta_S+\theta_n+t[\omega_{OC}-\omega_{OL}])$. In these forms, $\theta_S$ has the desired PSK phase modulation information, $\theta_n$ is a phase offset between the PSK modulated optical carrier and the CW reference optical carrier, and $\phi$ is the conjugate phase misalignment.

Here, the $\theta_S$'s take values in the PSK constellation being transmitted by the optical transmitter 6 and detected by the optical receiver 10. For embodiments of optical receiver 10 that decode data modulated onto the received optical carrier in the BPSK, QPSK, 8PSK, and 16PSK, the variable $\theta_S$ will take values in the sets $\{0, \pi\}$, $\{0, \pi/2, \pi, 3\pi/2\}$, $\{0, \pi/4, \pi/2, 3\pi/4, \pi, 5\pi/4, 3\pi/2, 7\pi/4\}$, and $\{\theta_S | \theta_S = M\pi/8 \text{ with } M=0, 1, \ldots 16\}$, respectively.

Figure 3:
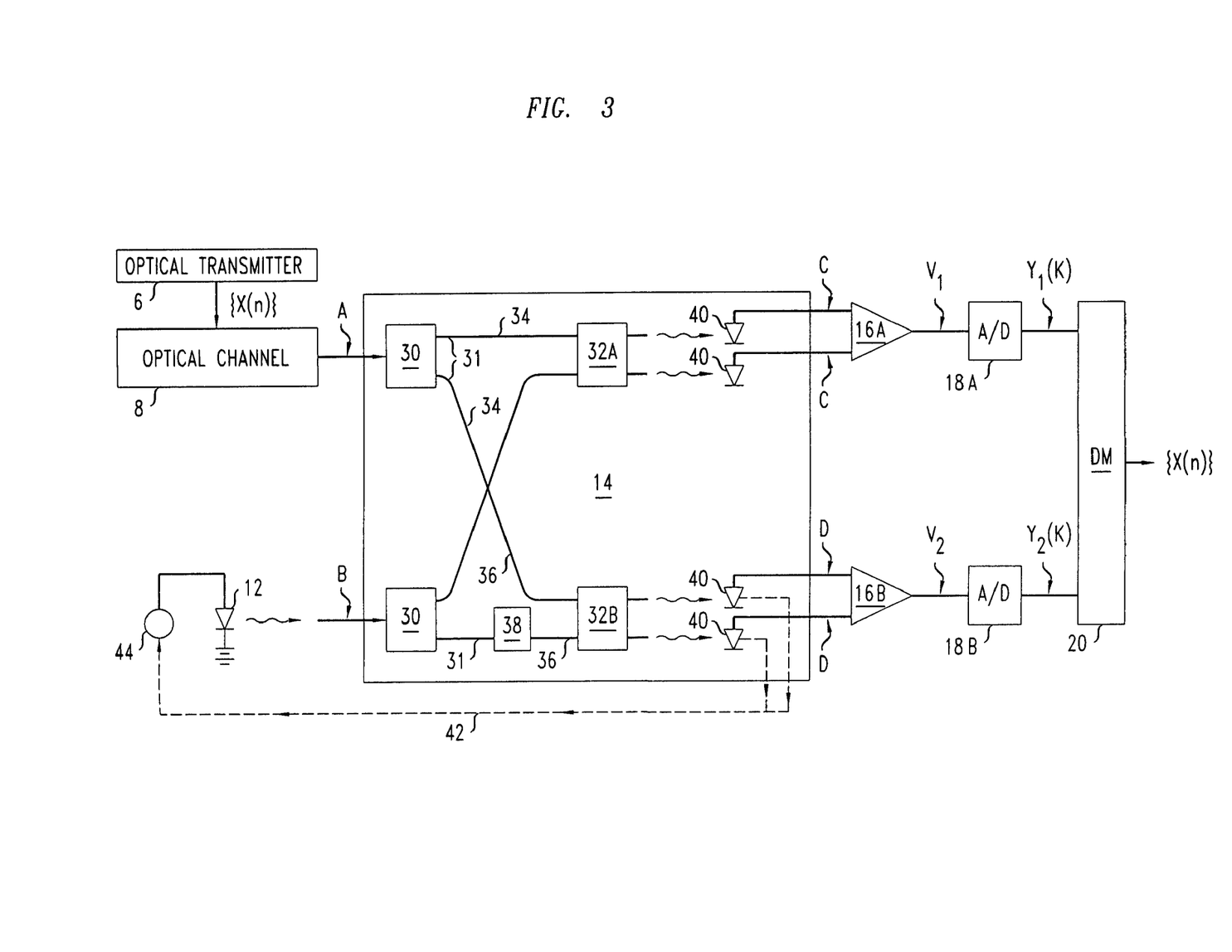
FIG. 3 is a block diagram illustrating a specific embodiment of an optical detector in one embodiment of the optical receiver of FIG. 2.

Here, the conjugate phase misalignment is the difference between $\pi/2$ and the relative difference between the phases of the reference optical carriers mixed with the received optical carrier in the optical mixers 32A and 32B. The conjugate phase misalignment is an angle in radians that is defined modulo $2\pi$. In particular, there is no conjugate phase misalignment if the components of the reference optical carrier mix with the modulated optical carrier with a relative phase difference of $\pi/2$ in the optical mixers 32A and 32B.

FIG. 3 shows an exemplary embodiment of the optical detector 14 of FIG. 2. The optical detector 14 may be, e.g., fabricated using conventional silicon optical bench technology, e.g., on a crystalline silicon substrate.

The optical detector 14 includes optical splitters 30; 2×2 optical mixers 32A, 32B; optical waveguides 34, 36; optical delay 38; and balanced pairs of photodiodes 40. The optical splitters 30, e.g., transmit one polarization component of the received light to each optical output 31. The optical outputs 31 of the optical splitters 30 connect via optical waveguides 34, 36 to the optical mixers 32A, 32B. The two optical mixers 32A, 32B coherently mix light received at their optical inputs to produce selected combinations at their optical outputs.

Indeed, each optical mixer 32A, 32B is constructed so that the difference between intensities of the selected combinations on the optical outputs of the optical mixer 32A, 32B has one of the above cosine and sine forms. The optical mixers 32A, 32B may be, e.g., conventional multi-mode interference (MMI) devices. For each optical mixer 32A, 32B, a pair of balanced photodiodes 40 functions as a detector for light transmit to the optical outputs of the optical mixer 32A, 32B.

In the optical detector 14, either the optical delay 38 and/or the waveguides 34, 36 produce a relative phase delay between conjugate components of the reference optical carrier. Here, conjugate components refer to two components of the reference optical carrier that are delivered to optical mixers 32A and 32B. The relative phase delay is equal to $\pi/2+\phi$, i.e., up to additions of $2\pi$ times an integer. The small angle $\phi$ is an undesired conjugate phase misalignment between the components input to the optical mixers 32A and 32B. Typically, a nonzero conjugate phase misalignment angle would be expected as a result of limits on manufacturing tolerances.

The A/D converters 18A, 18B digitalize the analog voltages $V_1$ and $V_2$ of the A/D converters 18A, 18B into a sequence of complex digital signals, Y(k). Here, $Y(k)=Y_1(k)+Y_2(k)$, and "k" indexes the sampling time at the A/D converters 18A, 18B. The digital components $Y_1(k)$ and $Y_2(k)$ satisfy a digitalized form of the above cosine and sine equations on the respective analog voltages $V_1$ and $V_2$. Here, "T" represents the sampling period in the A/D converters 18A, 18B and "k" is an integer variable to enumerate the time, i.e., 1, 2, 3, etc. The A/D converters 18A, 18B transmit the sequence of complex digital signals, i.e., the series $\{Y(k)\}$, to the DM 20.

The DM 20 processes the sequence of complex digital signals, Y(k), to reduce or remove undesired physical distortions and then, decodes the resulting processed signals. The processing reduces physical distortions associated with optical line widths, the optical phase offset, the optical frequency offset, and optionally the conjugate phase misalignment between the relative phases of the components of the reference optical carrier that are mixed with the received optical carrier. Absent such corrections, these physical distortions could cause systematic errors during decoding of the sequence of complex digital signals $\{Y(n)\}$. The decoding step recovers a sequence estimates, i.e., $\{X(n)\}$, corresponding to the sequence bit groups, i.e., $\{x(n)\}$, of the PSK signal points that have been modulated onto the optical carrier received at the optical input A.

The various physical distortions affect the values of the complex digital signals, i.e., the Y(k)'s. Several of these physical distortions are compensated or corrected in the DM 20 of FIGS. 2-3. That is, the analog distortions generated via optical transmission and analog optical detection are compensated or corrected in the digital domain rather than in the analog domain itself. For that reason, the optical receiver 10 does not need an optical PLL that tightly synchronizes the local optical oscillator 12 to the received modulated optical carrier.

Figure 6:
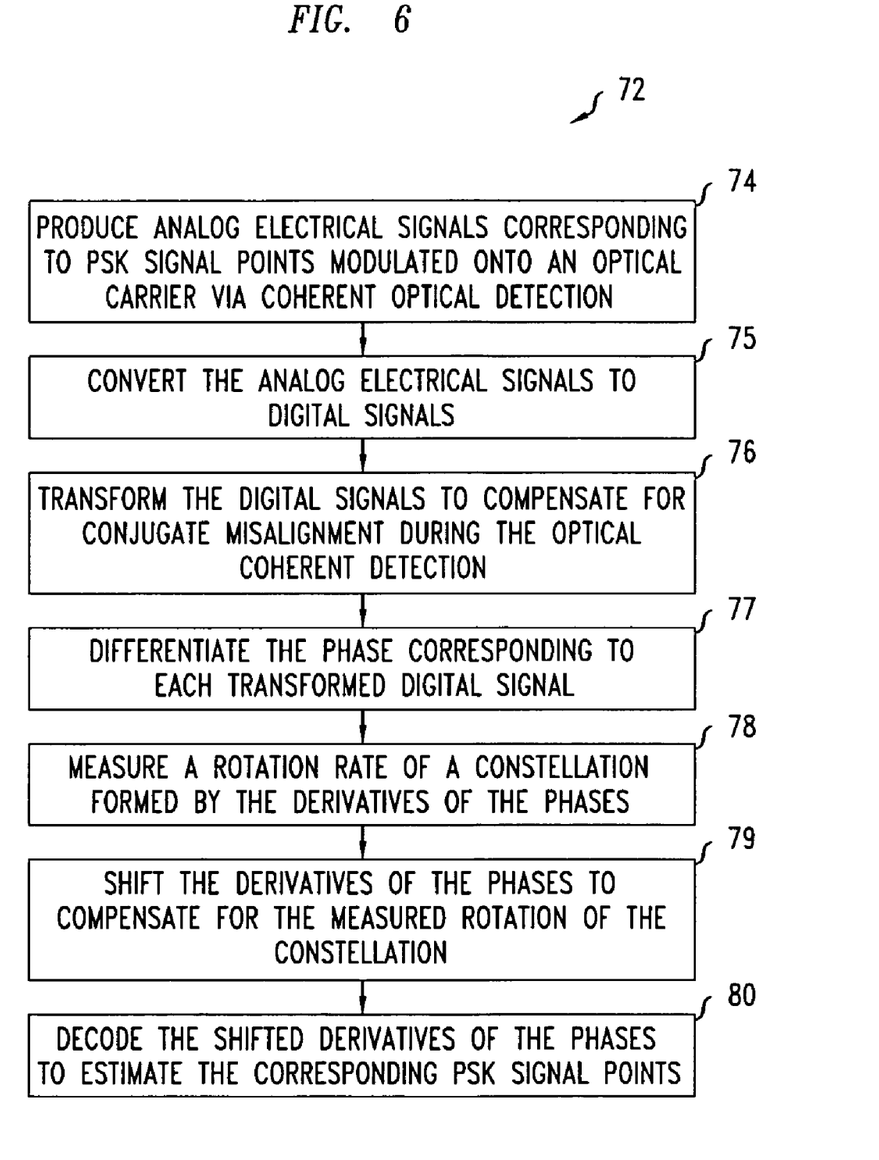
FIG. 6 illustrates a method of operating an optical receiver that provides for coherent detection of a PSK modulated optical carrier in differential coding.

FIG. 6 illustrates a method 72 of detecting and decoding a PSK modulated optical carrier. The method 72 can, e.g., be performed with the optical receiver 10 of FIGS. 2-3.

The method 72 includes producing analog electrical signals corresponding to the information modulated onto the received optical carrier by performing coherent optical detection of a PSK modulated optical carrier (step 74). The coherent optical detection includes optically mixing a reference optical carrier with the received PSK modulated optical carrier to extract information from two-phase components thereof. The optical mixing introduces distortions onto the analog electrical signals. The distortions are related to conjugate phase misalignments, phase offsets, and frequency offsets. The distortions cause the analog electric signals to lie off the PSK constellation.

The method 72 includes converting the analog electrical signals into a stream of digital signals (step 75). The digital signals are distorted due to the distortions produced during the optical transmission and coherent optical detection. The method 72 includes performing several steps on the digital signals to remove the various distortions.

One distortion of the Y(k)'s comes from conjugate phase misalignment between the components of the reference optical carrier that are used for the optical mixing with the modulated optical carrier. This conjugate phase misalignment distorts the shape of the PSK constellation on which the output electrical detection signals will be located when the two mixed optical components do not have a relative phase difference of $\pi/2$. In particular, the optical detection and digitalization produces a stream of complex digital signals, $Y(k) = Y_1(k)+iY_2(k)$. Due to the conjugate phase misalignment, the Y(k)'s lie on an ellipse rather than on a circle as for the signal points of the PSK constellations of FIGS. 1A-1D. To see this, we note that the above-definitions of Y(k) are: $Y_1(k)=R_1(k)$ and $Y_2(k)=R_1(k)\sin(\phi)+R_2(k)\cos(\phi)$ where $R_1(k)=A'\cos(\theta_S+\theta_n+T\cdot k[\omega_{OC}-\omega_{LO}])$ and $R_2(k)=A'\sin(\theta_S+\theta_n+T\cdot k[\omega_{OC}-\omega_{LO}])$. From these forms, it follows that:

$$\frac{U(k)^2}{R(k)^2(1+\sin\phi)} + \frac{V(k)^2}{R(k)^2(1-\sin\phi)} = 1$$

where $U(k)=Y_1(k)+Y_2(k)$, $V(k)=Y_1(k)-Y_2(k)$, and $[R(k)]^2 = [R_1(k)]^2+[R_2(k)]^2$. Thus, U(k) and V(k) obey the equation for an ellipse whose major axis is rotated by 45°, with respect to the x-axis of FIG. 1. Furthermore, the ellipse has an eccentricity that is different from zero when the conjugate phase misalignment angle, $\phi$, is nonzero. Thus, a such a conjugate phase misalignment of the mixed components of the reference optical carrier causes the detection signals, Y(k), to move off the circle on which the signal points of the PSK constellation lie. This distortion of the detected signal points can introduce systematic errors during decoding of the modulated optical carrier.

The method 72 includes transforming the complex digital signals, Y(k), to compensate for the distortion caused by a conjugate phase misalignment during the optical mixing (step 76). In particular, the transformation has the following form:

$Y_1(k) \to Z_1(k)=Y_1(k)$ and $Y_2(k) \to Z_2(k)=[Y_2(k)-Y_1(k)\cdot\sin(\phi_d)]/\cos(\phi_d)$.

The transformation effectively reduces or removes the dependence of Y(k) on the average conjugate phase misalignment angle, $\phi_d$. That is, the transformation effectively removes the difference between $\pi/2$ and the average difference between the relative phases of two optically mixed components of the reference optical carrier.

Figure 4A:
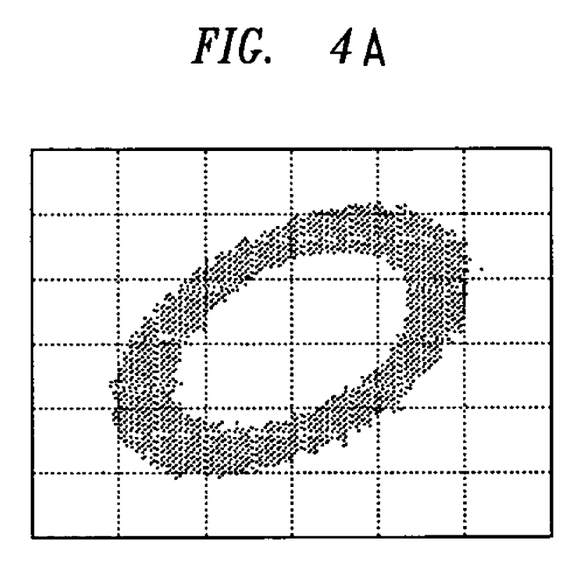
FIG. 4A shows a computer-simulated distribution of QPSK modulation values after distortion due to conjugate phase misalignment, frequency offset, and noise.
Figure 4B:
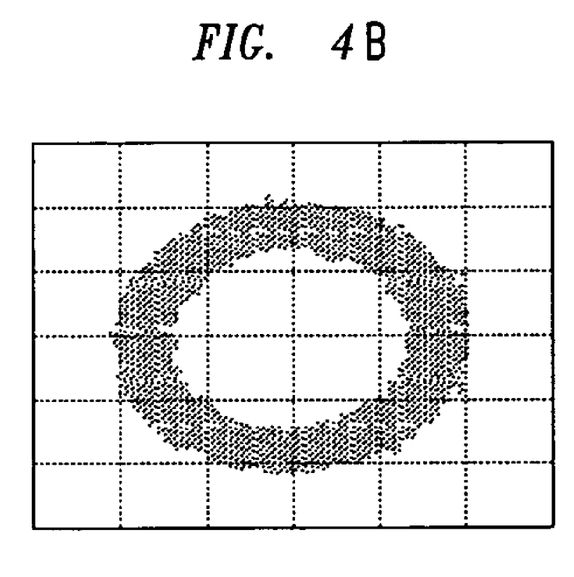
FIG. 4B shows a computer simulated distribution of QPSK modulation values of FIG. 4A after compensation to remove an averaged conjugate phase misalignment.

FIGS. 4A-4B show computer simulations that schematically illustrate the distortions caused by the conjugate phase misalignment and the effect of the above transformation in a QPSK modulation scheme. FIG. 4A illustrates how the conjugate phase misalignment, frequency offset, and noise can distort the detected distribution of QPSK modulation points, respectively. Due to this effect, the detected QPSK modulation points appear to lie in an elliptical annular region in which the ellipse has a nonzero eccentricity. FIG. 4B shows the effect of the transforming step 76 on the detected QPSK modulation points. The transforming step moves the detected signal points to a circular annular region that better matches the circular shape of the QPSK constellation.

Another distortion of the Y(k)'s is caused by the optical line widths of the optical transmitter and reference optical carrier. These line widths typically have approximately Gaussian distributions. The distributions have widths that often slowly walk off in time.

Another distortion of the Y(k)s is due to phase offset between the optical transmitter 6 and local optical oscillator 12. The phase offset rotates the constellation of detected digital signals by a fixed angle. Thus, the phase offset will change estimates of the values of the PSK signal points that were modulated onto the optical carrier.

The method 72 includes differentiating phases, P(k)'s, of the transformed digital signals from step 76, i.e., the Z(k)'s (step 77). The differentiation involves taking differences of the phases of consecutive ones of the digital signals, i.e., P(k)−P(k−1). These discrete time derivatives are substantially undistorted by the walk off caused by line widths and are substantially undistorted by the phase offset between the optical transmitter 6 and the local oscillator 12.

Another distortion of the Y(k)'s is due to the optical frequency offset between the PSK modulated optical carrier and the reference optical carrier. The optical frequency offset generates a slow temporal rotation of the constellation of digital signals, i.e., the Y(k)'s and the Z(k)'s. This rotation can also cause errors during decoding.

The method 72 includes measuring an averaged rotation rate of the constellation that is formed by the derivatives of the phases of step 77 (step 78). The rotation rate is measured and averaged over a large block of received digital signals in an off-line manner.

The method 72 also includes shifting the derivatives of the phases, i.e., the [P(k)−P(k−1)]'s, to compensate for the average rotation rate of the constellation said derivatives (step 79). In particular, from the above form of the phases, P(k), the phase difference [P(k)−P(k−1)] is approximately equal to ([$\theta_S(k)-\theta_S(k-1)$]+[$\theta_n(k)-\theta_n(k-1)$]+$T[\omega_{OC}(k)-\omega_{LO}(k)]$). In the phase difference, T is the length of the sampling period, and "$T[\omega_{OC}(k)-\omega_{LO}(k)]$" is an undesirable rotation of the signal points, i.e., a shift of the phases. This distortion can grow thereby moving the phase differences away from the signal points of the PSK constellation. At above step 79, the shift is a compensation that substantially removes this distortion due to the frequency offset so that the derivatives of the phases remain near points of the PSK constellation.

Figure 5A:
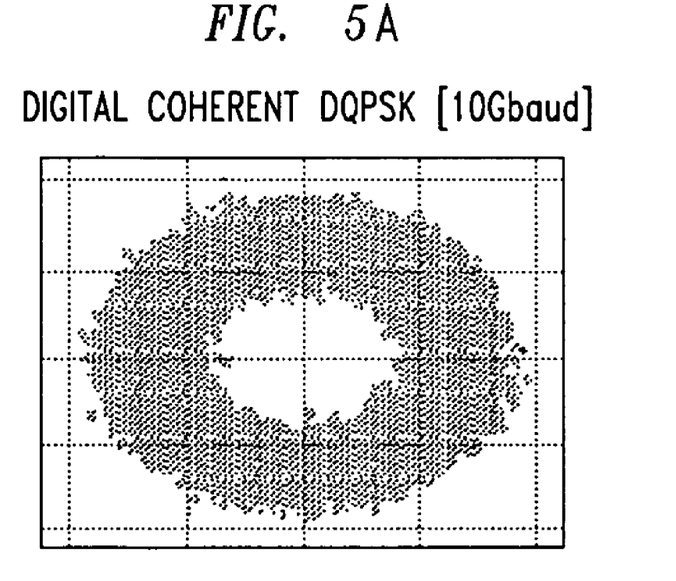
FIG. 5A shows a computer-simulated distribution of QPSK signal values in the presence of a frequency offset and noise.
Figure 5B:
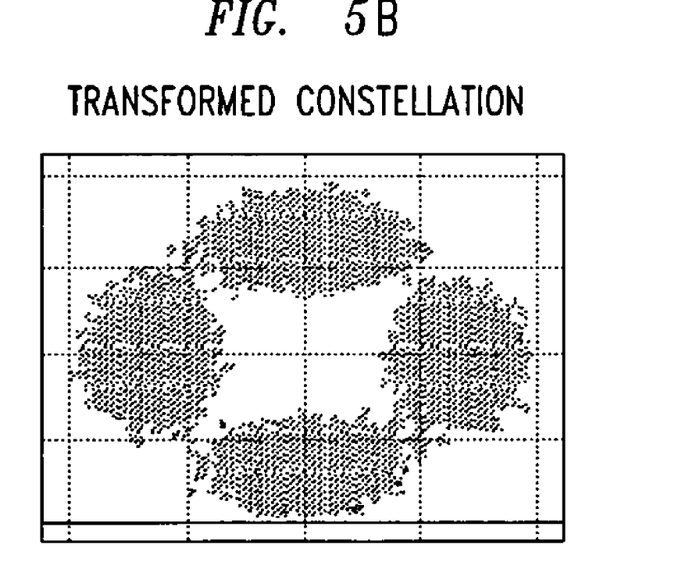
FIG. 5B shows a computer simulation of the QPSK signal points of FIG. 5A after compensation to remove a time-averaged frequency offset.

FIGS. 5A and 5B show results of computer simulations that schematically illustrate the distortion caused by the frequency offset and the effect of the above-described compensation. FIG. 5A shows how the frequency offset and noise effect the distribution of exemplary detected QPSK modulation values. The detected QPSK modulation points appear to lie in a circular annular region. FIG. 5B illustrates how compensating the frequency offset changes the constellation of such detected modulation points. The compensation of the constellation's rotation causes the detected modulation points to remain in four separated regions around the positions of the signal points of the QPSK constellation.

Figure 5C:
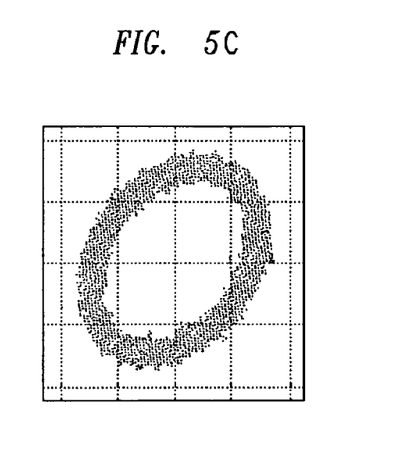
FIG. 5C shows a computer-simulated distribution of 8PSK modulation values after distortion due to conjugate phase misalignment, frequency offset, and noise.
Figure 5D:
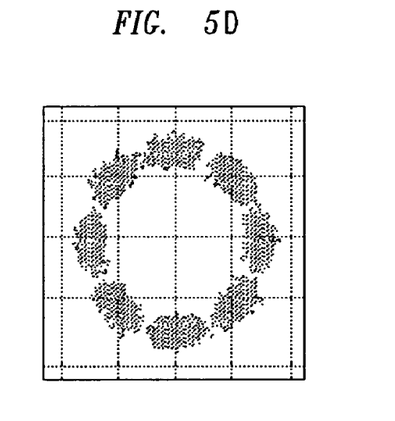
FIG. 5D shows a computer simulated distribution of the 8PSK modulation values of FIG. 5C after compensation to remove an average conjugate phase misalignment and an average frequency offset.

FIGS. 5C and 5D show results of computer simulations that illustrate distortions of the 8PSK constellation from the conjugate phase misalignment, the frequency offset and noise and the effect of the above-described compensations. FIG. 5C shows the distribution of distorted 8PSK signal points prior to compensation. The distorted 8PSK signal points lie on an eccentric elliptical annular region rather than on a circle as in the 8PSK constellation. FIG. 5D shows the effect of compensating the conjugate phase misalignment and the average frequency shift. Again, these transformations move the detected signal points to a circular annular region and separate the points into distinguishable groups that are located around each of the eight signal points of the original 8PSK constellation.

Another distortion of the Y(k)s is caused by optical and electrical noise. The optical noise is approximately zero-mean Gaussian noise at high signal-to-noise ratios (SNRs) and is approximately uniform random noise at low SNR. This noise can however, lead to decoding errors.

The method 72 involves performing decoding based on the shifted derivatives of the phases, i.e., the shifted [P(k)−P(k−1)]'s, to estimate the PSK signal points that are modulated onto the modulated optical carrier (step 80). This step may also include performing one or more techniques to correct errors in the estimated PSK signal points thereby substantially reducing the number of noise-related errors in the estimates.

Figure 7A:
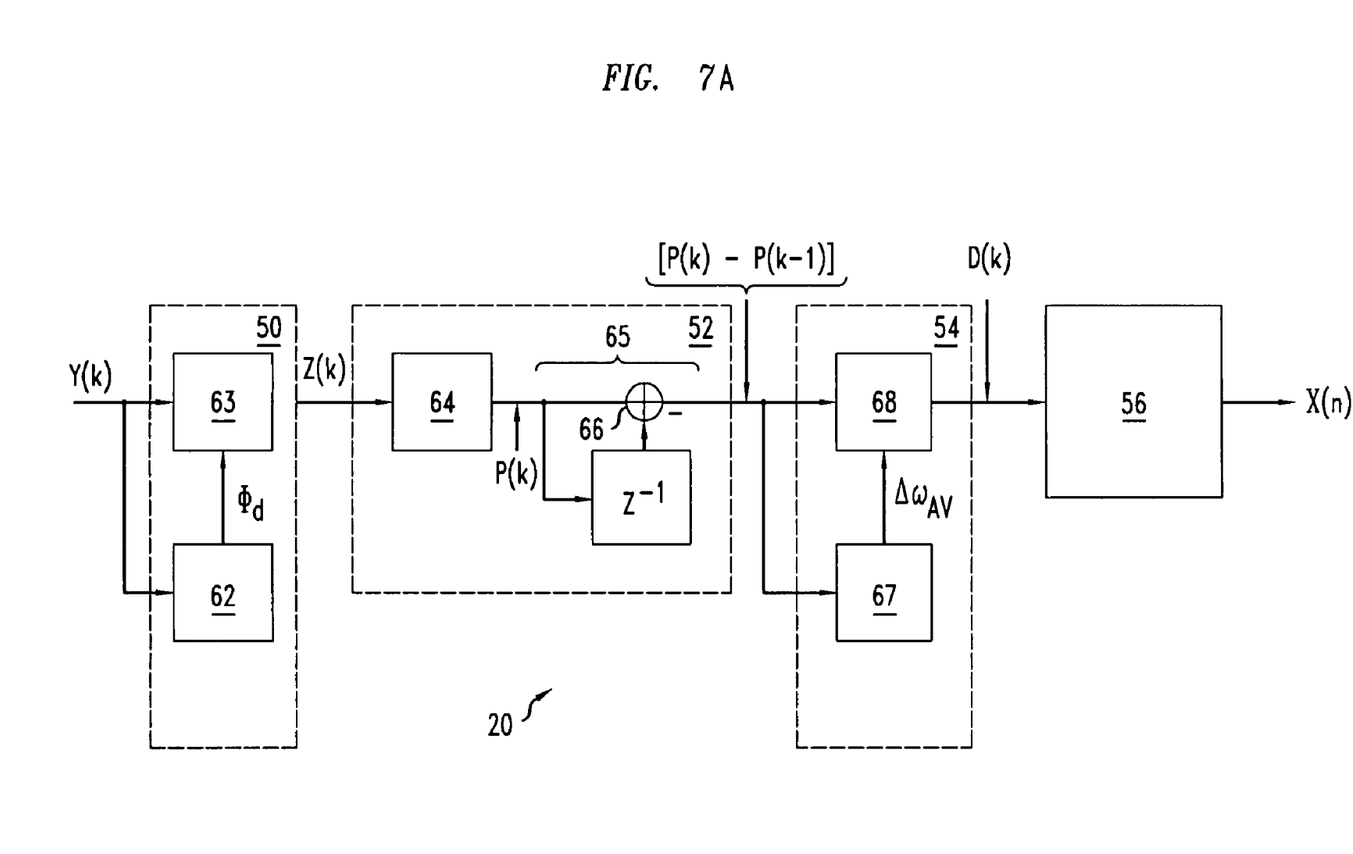
FIG. 7A shows an exemplary embodiment of the digital module (DM) of the optical receivers in FIGS. 2 and 3.

FIG. 7A shows an embodiment of the DM 20 of FIGS. 2-3, wherein the DM 20 has a sequence of four stages 50, 52, 54, 56. The stages 50, 52, 54, 56 digitally correct or compensate for physical effects that distorted the PSK modulated optical signal during transmission and/or analog optical detection.

The first stage 50 corrects for conjugate phase misalignment between the conjugate components of the reference optical carrier. In particular, the first stage compensates for the difference modulo $2\pi$ between the phase $\pi/2$ and the phase difference between the components of the reference optical carrier in optical mixer 32A and optical mixer 32B. The first stage 50 converts the received complex digital signals {Y(k)} into corresponding compensated complex digital signals {Z(k)}. In particular, the first stage of the DM includes one module 62 that supplies an estimate, $\phi_d$, of the conjugate phase misalignment angle, $\phi$, and one module 63 that corrects the complex digital signal, Y(n), based on the estimated angle, $\phi_d$.

The first module 62 stores an estimate, $\phi_d$. The estimate $\phi_d$ is either preset during calibration of the optical receiver 10 or dynamically determined during operation. The estimate is obtained by measuring a sequence of complex digital signals, Y(k), for the various PSK modulated optical carrier values and then, occasionally updating the estimate, $\phi_d$. In particular, the above-equations for U(k) and V(k) imply that $[U(k)]^2$ and $[V(k)]^2$ satisfy the following linear equation in the absence of noise.

$$[V(k)]^2 = \frac{-[U(k)]^2(1-c)}{(1+c)} + [R(k)]^2(1-c).$$

During operation, the module 62 may measure of slope, b, of $[V(k)]^2$ as a function of $[U(k)]$. From the slope, $\sin(\phi_d)$, i.e., "c", the value of "c" may be determined from the relation: c=[1−|b|]/[1+|b|]. As an example, the slope, b, can be found from $[u(n)]^2=f([v(n)]^2$, e.g. via a linear regression or least squares technique. The value of "c" may also be determined by fitting an ellipse to the data values U(k) and V(k). To avoid errors due to noise, $\phi_d$ may be determined in a calibration test under low noise conditions. Then, the first module 62 would simply store the fixed calibration value of $\phi_d$. Such a fixed value may be sufficient, because the nonzero value of $\phi$ is substantially due to manufacturing imperfections in the delay element 38 and optical waveguides 34, 36. In other embodiments, the module 62 may re-determine $\phi_d$ at regular intervals during operation of the optical receiver 10.

The second module 63 corrects the complex digital signal, Y(k), based on the determined value, $\phi_d$, of the conjugate phase misalignment. In particular, the second module 63 performs the following transformations.

$$Y_1(k) \to Z_1(k) = Y_1(k) \text{ and}$$

$$Y_2(k) \to Z_2(k) = [Y_2(k) - Y_1(k) \cdot \sin(\phi_d)]/\cos(\phi_d).$$

These transformations may include performing a table look-up, e.g., in a ROM table, to determine the transformed value of $Y_2(k)$ from measured values of $Y_2(k)$, $Y_1(k)$ and $\sin(\phi_d)$. If the conjugate phase misalignment angle, $\phi$, and its estimate, $\phi_d$, are equal, the above transformation replaces, Y(k), by a complex Z(k) having the following form:

$$Z(k) = A \{ \cos(\theta_S + \theta_n + kT[\omega_{OC} - \omega_{LO}]) + i \cdot \sin(\theta_S + \theta_n + kT[\omega_{OC} - \omega_{LO}]) \}.$$

That is, Z(k) is the form of the complex digital signal, Y(k), in the absence of a conjugate phase misalignment in the optical detector 14.

The second stage 52 includes a phase determination module 64 and a phase differentiation block 65. The phase evaluation module 64 extracts a digital phase values, P(k), from each complex digital signals Z(k), i.e., at the baud rate. In particular, each phase, P(k), has the form: $(\theta_S + \theta_n + kT[\omega_{OC} - \omega_{LO}])$ for the above-described form of Z(k). In the phases $\{P(k)\}$, the values of the variables $\theta_S$, $\theta_n$, $\omega_{OC}$, and $\omega_{LO}$ may vary with the discrete time variable "k", i.e., vary at the baud rate. The differentiation block 65 includes a digital adder 66 and a delay element, $Z^{-1}$, for one sampling period of the A/D converters 18A, 18B. The differentiation block 65 differentiates the phase P(k). In particular, the differentiation block 65 outputs a discrete derivative of the phase, i.e., the set of values $\{[P(k)-P(k-1)]\}$, at the baud rate. In this derivative, the difference $[\theta_n(k) - \theta_n(k-1)]$ is independent of the phase offset between the PSK modulated optical carrier and the CW reference optical carrier. That is, the difference $[\theta_n(k) - \theta_n(k-1)]$ is approximately a zero-mean noise signal. For that reason, the digital output signals from the second stage 52 are substantially independent of the phase offset between the light sources of the optical transmitter and the optical receiver 10.

In some embodiments, the compensation for conjugate phase misalignment of the first stage 50 and the phase determination of the module 64 may be combined into one table look up. This table look up would determine the P(k)'s directly based on the received values of the $[Y_1(k) + iY_2(k)]$'s.

The third stage includes a frequency offset estimator module 67 and a frequency offset compensator module 68.

Figure 5E:
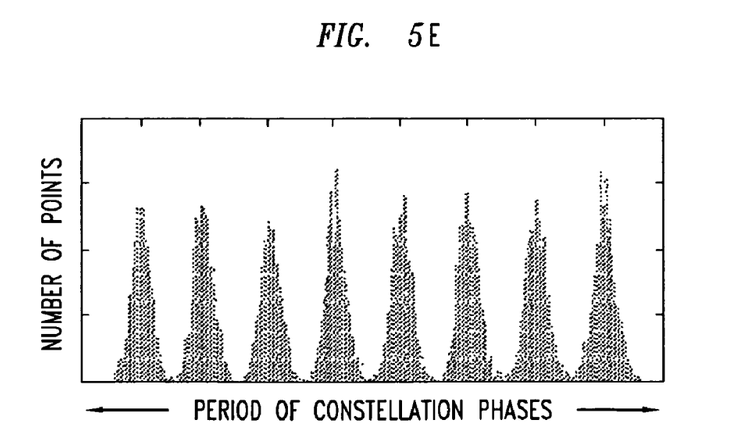
FIG. 5E shows a computer-simulated distribution of phases of 8PSK modulation values in the presence of noise and a frequency offset.

The frequency offset estimator module 67 accumulates data on phase differences [P(k)-P(k-1)] over an averaging period. The averaging period is shortened if the magnitude of the time derivative of the frequency offset grows. For a suitably statistics, the phase differences peak around shifted values of the PSK signal points due to the frequency offset, i.e., $T[(\omega_{OC}(k) - \omega_{LO}(k)]$. Thus, the estimation of the frequency offset involves a circular folding of the phase difference data such that the peaks for different points of the appropriate PSK constellation coincide. FIG. 5E illustrates simulated phase difference data for use in the folding operation on a 8PSK modulated carrier. The folding operation would superimpose the eight peaks for the different 8PSK signal points to increase the statistics for the estimate of the frequency offset. In particular, the peaks have widths determined by the zero-mean noise associated with $[\theta_n(k) - \theta_n(k-1)]$. From the angular shift of the positions of these peaks, the frequency offset estimator module 67 determines an averaged frequency offset, i.e., $\Delta\omega_{AV}(k)$, which is the average of $[\omega_{OC}(k) - \omega_{LO}(k)]$.

In calculating the average location of a peak, it is advantageous to account for the periodic nature of the interval of phase differences. In particular, the tail of a peak may occur on one side of the interval while the bulk of the peak is on the opposite side of said interval. One procedure for finding the average over a distribution of wrapped phase values involves making a coarse estimate of a peak location, e.g., by the presence of a region with many points, shifting the distribution so that the peak is away from the interval's boundary, averaging over points in the shifted distribution, and subtracting off the shift to estimate the frequency offset. This shift-based procedure eliminates situations where points of the peak are on both sides of the interval, i.e., the shift step moves all signal points of the peak to a contiguous interval.

The frequency offset compensator module 68 uses the estimated frequency offset, i.e., $\Delta\omega_{AV}$, to compensate the received phase differences, i.e., the [P(k)-P(k-1)]'s, at the baud rate. In particular, the frequency offset compensator module 68 shifts each phase difference as defined by:

$$[P(k)-P(k-1)] \to D(k) = [P(k)-P(k-1)] - T\Delta\omega_{AV}(k).$$

If the frequency offset is constant over the averaging period of $\Delta\omega_{AV}$, D(k) is approximately equal to $[(\theta_S(k) - \theta_S(k-1)) + (\theta_n(k) - \theta_n(k-1))]$. Thus, if the various compensations are accurate, the digital values $\{D(k)\}$ will represent differentially encoded PSK signal points, i.e., the $[(\theta_S(k) - \theta_S(k-1))]$'s, which are substantially only distorted by zero-mean noise, i.e., $\{[(\theta_n(k) - \theta_n(k-1))]\}$.

The fourth stage 56 includes one or more decoders that use the D(k)'s to make estimates $\{X(n)\}$ of the sequence of the PSK signal points $\{x(n)\}$ that modulated the received optical carrier. Such decoders may function in parallel so that one decoder decodes a specific bit in each PSK symbol. Such decoders may also decode serially in a PSK symbol-by-symbol manner.

After the decoding to produce the X(n)'s, other apparatus (not shown) perform conventional error correction, e.g., forward error correction, and use framing information to produce the final evaluation of the sequence of transmitted PSK symbols. For example, such framing information may be used to remove any ambiguity with respect to the PSK information that the transmitter 6 has coded via differential encoding.

Figure 7B:
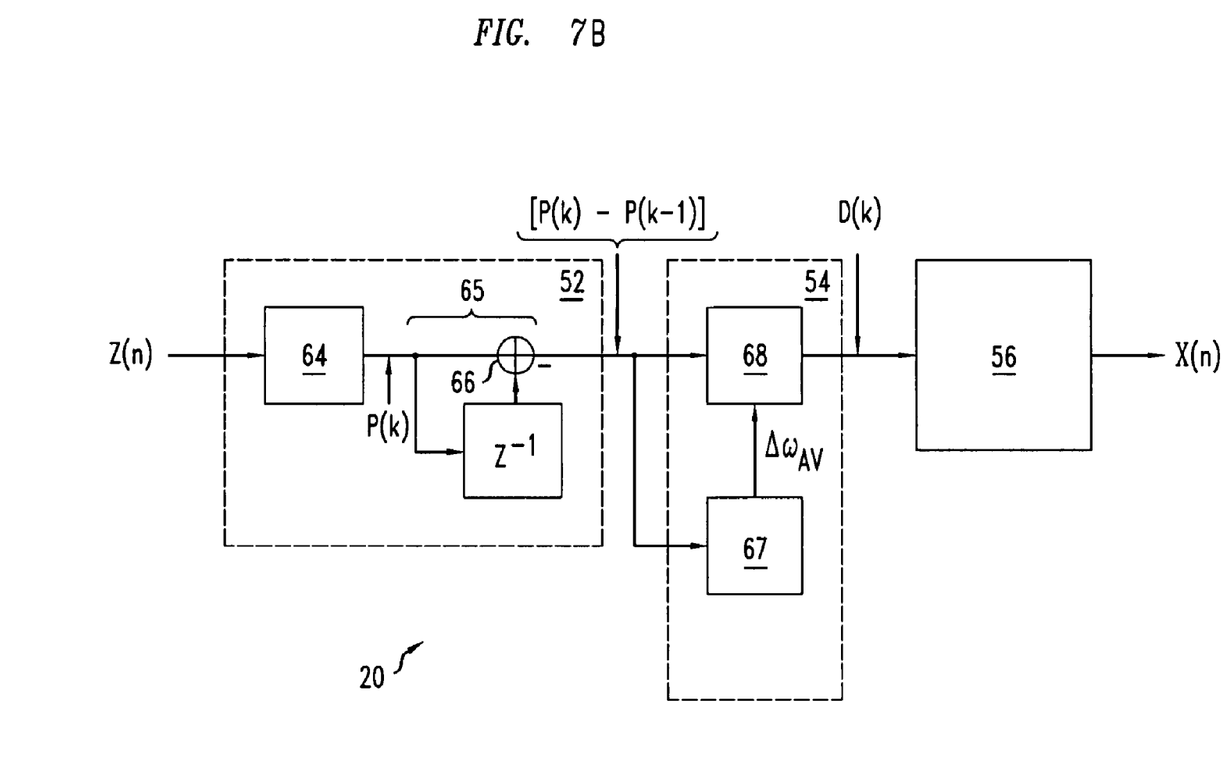
FIG. 7B shows an alternate exemplary embodiment of the DM of the optical receivers in FIGS. 2 and 3 in which compensation of conjugate phase misalignment is not performed digitally.

FIG. 7B shows an alternate embodiment of the DM 20 of FIGS. 2-3. The alternate DM 20 has only three stages 52, 54, 56 for digitally correcting or compensating the physical effects that distorted the PSK modulated optical signal during transmission and/or analog detection. In particular, the alternate DM 20 has no stage 50 for performing a compensation for conjugate phase misalignment. Instead, this distortion is corrected in the analog domain, e.g., by a calibration of the optical detector 14 during manufacture. Thus, the DM 20 of FIG. 7B receives input digital signals, i.e., the Z(n)'s, which have already been corrected for conjugate phase misalignments.

In some embodiments, the optical receiver 10 includes an optional electronic feedback loop 42 that loosely controls the frequency of the local optical oscillator 12 via a control device 44. In particular, the feedback loop 42 monitors the power output of one or more of the pairs of the photodiodes 40. In the presence of a large frequency offset, the output powers of the pairs of photodiodes 40 decrease. The feedback loop 42 may provide analog measurements of output power of the photodiodes 40 or digital measurements of the amplitudes of digital signals Y(k), e.g., by the DM 20. In either case, this loose feedback control of the frequency, $\omega_{LO}$, of the CW reference optical carrier only sets $\omega_{LO}$ to be in a selected range, i.e., a range where the photodiodes 40 have output powers that are not very low. Such loss feedback control helps to maintain a high photodiode performance, but does not eliminate to need for further effective digital phase and frequency offset corrections by the DM 20.

In some embodiments, the DMs 20 of FIGS. 2-3, 7A, and 7B are embodied in hardware or a combination of hardware and software. The DM 20 may include an input/output device, a data storage device, a bus, a memory, and a general digital processor. The data storage device may store a program of machine executable instructions and data for performing the functions of the stages 50, 52, and 54 when executed on the general digital processor.

In other embodiments, the digital modules 20 of FIGS. 2, 3, 7A, and 7B may also be digital signal processors (DSPs), application specific integrated circuits (ASICs), or field programmable gate arrays (FPGAs). Various ones of these technologies may improve the performance of the digital processing of the DM 20 at the required operating speeds.

Referring to FIGS. 7A-7B, the method 72 and DM 20 may be incorporated into receivers for other types of electromagnetic radiation. For example, embodiments of the DM 20 may be part of a coherent wireless detector. In such embodiments, the DM 20 can again provide correction/compensation of conjugate phase misalignment, phase offsets, and frequency offsets that are common to other coherent detectors. Such digital compensation could be done without a PLL that tightly locks the phase of the local oscillator to the phase of the received modulated carrier.

From the disclosure, drawings, and claims, other embodiments of the invention will be apparent to those skilled in the art.

What is claimed is:

1. A receiver for coherent detection of a PSK modulated optical carrier, comprising:
    an optical detector being configured to mix the modulated optical carrier with two different phase components of a reference optical carrier and to produce analog output signals representative of optical signals produced by said mixing;
    analog-to-digital converters connected to receive the analog output signals and to produce digital signals from the received analog output signals; and
    a digital module being configured to receive the digital signals and to compensate the received digital signals for a conjugate phase misalignment between the two mixed components of the reference optical carrier.

2. The receiver of claim 1, wherein the digital module is configured to decode the PSK modulated optical carrier to obtain signal points in a PSK constellation having at least four signal points.

3. The receiver of claim 2, wherein the digital module is configured to estimate a frequency offset of the two carriers from the received digital signals.

4. The receiver of claim 2, wherein the digital module is configured to differentiate the phases of the received digital signals and estimate a frequency offset of the two carriers from the received digital signals.

5. The receiver of claim 2, wherein the digital module comprises a module configured to use the received digital signals to estimate a frequency offset between the two carriers.

6. The receiver of claim 5,
    wherein the digital module comprises a module configured to use the estimated frequency offset to produce frequency offset-compensated digital signals from the received digital signals; and
    wherein the digital module is configured to extract data modulated onto the optical carrier from the frequency-compensated digital signals.

7. The receiver of claim 1, wherein the module comprises a phase estimator that is configured to evaluate phases of conjugate phase misalignment compensated ones of the digital signals.

8. The receiver of claim 5, further comprising:
    a laser source connected to transmit the reference optical carrier to the optical detector; and
    an electronic feedback loop being connected to the laser source and being configured to maintain a frequency of light from the laser source in a selected range.

9. A receiver for coherent detection of a PSK modulated optical carrier, comprising:
    an optical detector being configured to mix the modulated optical carrier with different phase components of a reference optical carrier and to produce analog output signals representative of optical signals produced by said mixing;
    analog-to-digital converters connected to receive the analog output signals and to produce digital signals from the received analog output signals;
    a digital module being connected to the receive the digital signals and to perform one of compensating the received digital signals for a conjugate phase misalignment between the mixed components, extracting phases of the received digital signals, and estimating a frequency offset between the two carriers from the received digital signals;
    a laser source connected to transmit the reference optical carrier to the optical detector; and
    an electronic feedback loop being connected to the laser source and being configured to maintain a frequency of light from the laser source in a selected range; and
    wherein the digital module is configured to decode the PSK modulated optical carrier to obtain signal points in a PSK constellation having at least four signal points and the digital module comprises a module configured to use the received digital signals to estimate a frequency offset between the two carriers; and
    wherein the electronic feedback loop is configured to maintain a below-threshold frequency difference between the reference and the modulated optical carriers.

10. The receiver of claim 2, wherein the optical detector further comprises first and second optical mixers, each optical mixer being connected to mix the received optical carrier with one of the phase components of the reference optical carrier.

11. A method, comprising:
    mixing a PSK modulated optical carrier with first and second phase components of a reference optical carrier;
    producing electrical signals by measuring intensities of optical signals formed by the mixing;
    digitalizing the electrical signals to produce a series of digital signals;
    evaluating derivatives of phases of the digital signals;
    demodulating the PSK modulated optical cater based on the evaluated derivatives;
    digitally transforming the digital signals to compensate for a conjugate phase misalignment between the first and second components; and
    wherein the evaluating step is based on the transformed digital signals.

12. The method of claim 11, further comprising:
    extracting a phase from each of the digital signals; and wherein the evaluating determines derivatives of the phases.

13. The method of claim 11, further comprising:
estimating a frequency offset between the optical carriers based on the evaluated derivatives.

14. An apparatus, comprising:
a digital module being configured to evaluate a sequence of PSK symbols that modulates a received optical carrier by decoding a stream of digital signals, the digital signals being produced by down mixing the received optical carrier with a reference optical carrier and wit a relatively phase-shifted version of the reference optical carrier, the digital module being configured to compensate the digital signals for conjugate phase misalignment between the two reference optical carriers mixed with the received optical carrier.

15. The apparatus of claim 14, wherein the digital module is configured to extract PSK symbols modulated onto the received optical carrier from the received digital signals, wherein the PSK symbols include at least four different signal points.

16. The apparatus of claim 15, wherein the digital module comprises a module that uses the digital signals to estimate a frequency offset between the two carriers.

17. The apparatus of claim 15, wherein the digital module comprises:
a phase estimator tat is configured to evaluate a phase of compensated ones of the digital signals; and
a differentiator configured to receive and differentiate the phase of the compensated ones of the digital signals.

* * * * *